United States Patent
Kim et al.

(10) Patent No.: US 10,511,911 B2
(45) Date of Patent: Dec. 17, 2019

(54) METHOD AND APPARATUS OF PLAYING MUSIC BASED ON SURROUNDING SITUATIONS

(71) Applicant: Samsung Electronics Co., Ltd., Suwon-si (KR)

(72) Inventors: Changhyun Kim, Seongnam-si (KR); YoungWan Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/013,003

(22) Filed: Jun. 20, 2018

(65) Prior Publication Data
US 2019/0052967 A1    Feb. 14, 2019

(30) Foreign Application Priority Data
Aug. 11, 2017  (KR) .................. 10-2017-0102242

(51) Int. Cl.
| | |
|---|---|
| H04R 5/04 | (2006.01) |
| H04R 5/02 | (2006.01) |
| H04R 1/40 | (2006.01) |
| B60Q 9/00 | (2006.01) |
| G05D 1/02 | (2006.01) |

(52) U.S. Cl.
CPC ............ *H04R 5/04* (2013.01); *B60Q 9/00* (2013.01); *H04R 1/403* (2013.01); *H04R 5/02* (2013.01); *G05D 1/021* (2013.01); *G05D 2201/0213* (2013.01); *H04R 2430/01* (2013.01); *H04R 2499/13* (2013.01)

(58) Field of Classification Search
CPC . H04R 5/04; H04R 5/02; H04R 1/403; H04R 2430/01; H04R 2499/13; B60Q 9/00; B60Q 9/002; B60Q 9/004; B60Q 9/006; B60Q 9/007; B60Q 9/008; B60Q 5/006; B60Q 5/005; G05D 1/021; G05D 2201/0213
USPC ................................................ 381/86
See application file for complete search history.

(56) References Cited

U.S. PATENT DOCUMENTS

| | | | |
|---|---|---|---|
| 5,625,696 A | 4/1997 | Fosgate | |
| 6,097,285 A * | 8/2000 | Curtin | B60Q 9/006 340/384.1 |

(Continued)

FOREIGN PATENT DOCUMENTS

| | | |
|---|---|---|
| JP | 2008-149917 A | 7/2008 |
| JP | 5041983 B2 | 10/2012 |

(Continued)

OTHER PUBLICATIONS

Chew, Elaine, et al. "ESP: A Driving Interface for Expression Synthesis." *Proceedings of the 2005 conference on New interfaces for musical expression*. National University of Singapore, 2005. (pp. 224-227).

*Primary Examiner* — Jason R Kurr
(74) *Attorney, Agent, or Firm* — Sughrue Mion, PLLC

(57) ABSTRACT

Disclosed is a method and apparatus for playing music that acquires surrounding situation information including a driving situation and a movement of an object relative to a driving vehicle, generates sound information to represent the surrounding situation information as a change in a sound transferred through an audio device including speakers in the vehicle, and controls the audio device based on the sound information to play the music.

21 Claims, 11 Drawing Sheets

(56) References Cited

U.S. PATENT DOCUMENTS

| | | | | |
|---|---|---|---|---|
| 6,876,298 | B2* | 4/2005 | Litkouhi | B60Q 9/006 |
| | | | | 180/274 |
| 7,741,962 | B2* | 6/2010 | Kalik | G01S 13/931 |
| | | | | 340/435 |
| 8,212,659 | B2* | 7/2012 | Iwamoto | B60W 50/14 |
| | | | | 180/167 |
| 9,338,554 | B2 | 5/2016 | Christoph | |
| 9,372,251 | B2 | 6/2016 | Soulodre | |
| 9,380,383 | B2 | 6/2016 | Brenner et al. | |
| 9,469,247 | B2 | 10/2016 | Juneja et al. | |
| 2003/0156019 | A1* | 8/2003 | Lehmann | B60Q 5/005 |
| | | | | 340/435 |
| 2006/0215844 | A1* | 9/2006 | Voss | H04R 25/70 |
| | | | | 381/60 |
| 2014/0211962 | A1* | 7/2014 | Davis | H04R 3/00 |
| | | | | 381/86 |

FOREIGN PATENT DOCUMENTS

| | | |
|---|---|---|
| JP | 2015-22453 A | 2/2015 |
| JP | 2016-15142 A | 1/2016 |
| JP | 2016-197390 A | 11/2016 |
| JP | 2017-59095 A | 3/2017 |
| KR | 10-0843906 B1 | 7/2008 |
| KR | 10-132112 B1 | 11/2013 |

* cited by examiner

METHOD AND APPARATUS OF PLAYING MUSIC BASED ON SURROUNDING SITUATIONS

CROSS-REFERENCE TO RELATED APPLICATIONS

This application claims the benefit under 35 USC § 119(a) of Korean Patent Application No. 10-2017-0102242 filed on Aug. 11, 2017 in the Korean Intellectual Property Office, the entire disclosure of which is incorporated herein by reference for all purposes.

BACKGROUND

1. Field

The following description relates to a method and apparatus of playing music based on surrounding situations of a driving vehicle.

2. Description of Related Art an autonomous car (also known as a driverless car, self-driving car, robotic car[1]) and unmanned ground vehicle is.

Autonomous driving may involve a vehicle that is capable of sensing its environment and navigating without human input or it may involve assisting the driver to make driving easier and more convenient. In an example, an advanced driver assistance system (ADAS) may provide various pieces of information for user convenience. The information provided by the ADAS, for example, visual information and auditory information, may be used for fully automated driving or driver support. The visual information acquired from two images may not be sufficient to accurately show a dangerous situation and a surrounding situation, for example, an approach of a neighboring vehicle and a traffic situation, based on weather, for example, rain, or a time of darkness, for example, nighttime.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of playing music, the method including acquiring surrounding situation information including a driving situation and a movement of an object relative to a vehicle, generating sound information to represent the surrounding situation information as a change in a sound transferred through an audio device of the vehicle, the audio device including speakers, and controlling the audio device based on the sound information to play the music.

The surrounding situation information may include any one or any combination of whether the object is present, whether the object is stationary, a class of the object, an approaching direction of the object, an approaching distance of the object, a position of the object, a velocity of the object, whether a distance between the object and the vehicle is increasing or decreasing, a traffic situation of a lane on which the vehicle is traveling, a type of the lane, a weather, a season, a light condition, and a temperature.

The generating of the sound information may include generating the sound information for adjusting, based on the surrounding situation information, any one or any combination of a panning effect of the speakers, a volume of the sound transferred through the speakers, a playing speed of the sound transferred through the speakers, a position of a speaker that transfers the sound among the speakers, a radiating direction of the sound from the speakers, a sound attribute of the speakers, and a type of the sound transferred through the speakers.

The method include setting, based on a hearing sensitivity of a driver of the vehicle, at least one of a volume of the sound transferred through the speakers, a position of a speaker that transfers the sound among the speakers, a radiating direction of the sound from the speakers, whether the speakers are used, or a sound attribute of the speakers.

The generating of the sound information may include generating the sound information for a speaker disposed at a position among the speakers based on any one or any combination of whether the object is approaching a position of a passenger including a driver of the vehicle, an approaching direction of the object, and an approaching distance of the object.

The generating of the sound information may include generating the sound information for adjusting a volume of a sound transferred through a speaker disposed at a position among the speakers based on any one or any combination of whether the object is approaching the vehicle, an approaching direction of the object, and an approaching distance of the object.

The generating of the sound information for adjusting the volume of the sound may include increasing the sound information for adjusting the volume of the sound transferred through the speakers in inverse proportion to the approaching distance of the object, in response to the approaching distance of the object relative to the vehicle being less than a reference distance.

The generating of the sound information for adjusting the volume of the sound may include decreasing the sound information for adjusting the sound transferred through the speakers in inverse proportion to the approaching distance, in response to the approaching distance of the object relative to the vehicle being greater than or equal to a reference distance, or maintaining the volume of the sound transferred through the speakers without a change, in response to the approaching distance of the object relative to the vehicle being greater than or equal to the reference distance.

The generating of the sound information may include generating the sound information for determining any one or any combination of a position of a speaker that transfers the sound among the speakers and a radiating direction of the sound, based on an approaching direction of the object relative to the vehicle.

The generating of the sound information may include generating, based on the movement of the object relative to the vehicle, the sound information by performing a source separation on the music to map a sound of a instrument or a sound of a range to the object such that the sound of the instrument on which the source separation is performed or the sound of the range on which the source separation is performed is transferred through the speakers.

The generating of the sound information may include separating the music into single tracks for respective instruments or respective ranges based on performing source separation on the music, mapping the single tracks for the respective instruments or the respective ranges to the object, and generating the sound information for transferring the sound mapped to the object through the speakers.

The generating of the sound information may include generating the sound information for transferring a sound of a track among multiple tracks through the speakers based on the movement of the object relative to the vehicle, in response to the music being a multi-track recording, and generating the sound information by performing a source separation on the music such that a sound of a instrument on which the source separation is performed or a sound of a range on which the source separation is performed is transferred through the speakers, based on the movement of the object relative to the vehicle, in response to the music being a mono-track recording.

The generating of the sound information may include generating the sound information for adjusting a playing speed of the sound transferred through the speakers based on an approaching velocity at which the object is approaching the vehicle.

The generating of the sound information may include generating the sound information for playing any one of a sound of a track of the music, a sound of a instrument included in the music, and a sound of a range of the music, in response to a type of a lane on which the vehicle is traveling.

The playing of the music may include playing the music by applying a sound effect including a sound attribute mapped to the object based on the sound information.

The playing of the music may include playing the music by adding a preset effect sound, in response to the surrounding situation information.

The acquiring of the surrounding situation information may include sensing the surrounding situation information using any one or any combination of an image sensor, an ultrasonic sensor, a global positioning system (GPS) sensor, a light detection and ranging (LiDAR) sensor, a radar, and a microphone.

The method may include verifying the occurrence of an event that requires a notification directed to an occupant of the vehicle based on the surrounding situation information, wherein the generating of the sound information may include generating the sound information, in response to the occurrence of the event.

The acquiring of the surrounding situation information may include recognizing the surrounding situation information based on applying data collected from sensors to a neural network trained in advance.

The reference distance may be stored in a lookup table in a non-transitory computer-readable storage medium, and may be based on any one or any combination of a class of the object, a velocity of the object, and a velocity of the vehicle.

In another general aspect, there is provided a apparatus for playing music, including sensors configured to acquire surrounding situation information including a driving situation and a movement of an object relative to a vehicle, and a processor configured to generate sound information to represent the surrounding situation information as a change in a sound transferred through an audio device of the vehicle, the audio device including speakers, and to control the audio device based on the sound information to play the music.

Other features and aspects will be apparent from the following detailed description, the drawings, and the claims.

Figure 1:
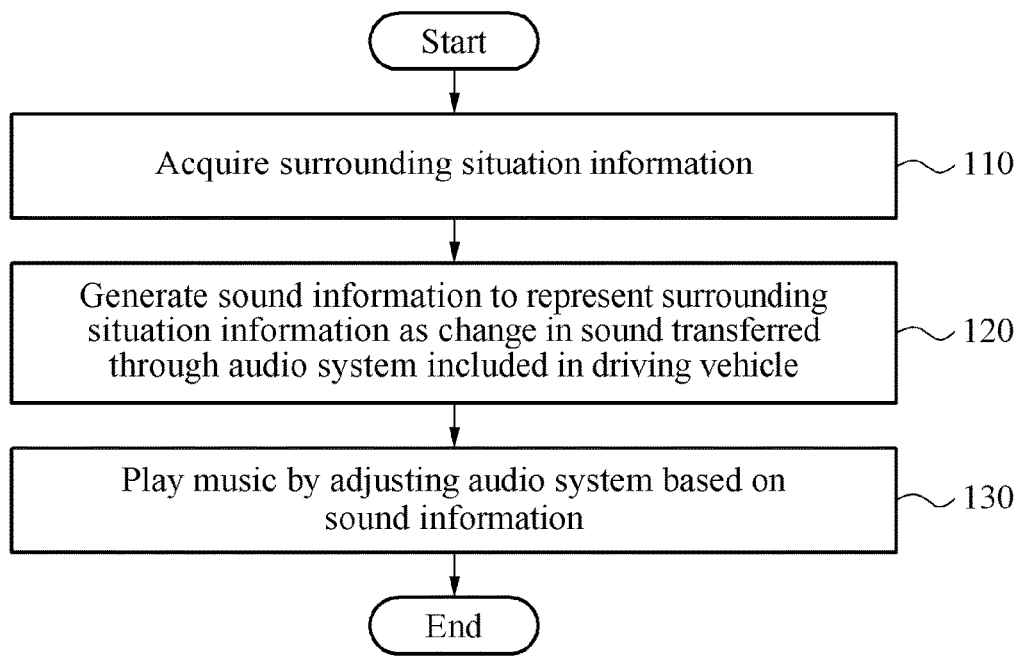
FIG. 1 is a diagram illustrating an example of a method of playing music.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

The following examples may be applied to generate information for an autonomous driving vehicle to control a vehicle or support driving. The embodiments may also be used to interpret visual information and/or auditory information based on a driving habit of a user, an environment setting for the user, and a driving situation in a device including an intelligent system installed for driving assistance in a vehicle or a fully autonomous driving system to assist safe and comfortable driving. The embodiments are applicable to, for example, a mobile device, a smartphone, an advanced driver assistance system (ADAS), an intelligent vehicle, and an autonomous driving vehicle.

Hereinafter, a "road" refers to a road on which humans or vehicles travel. For example, a road includes an expressway, a national highway, a local road, and a national expressway. A road may include one lane or a plurality of lanes. The lanes may be distinguished by lines indicated on a road surface. Hereinafter, a "lane" may be understood as a plane space used by a driving vehicle, that is, a plane space in which a driving vehicle is traveling. One lane may be distinguished by lines indicated on the right and the left of the lane.

In an example, vehicle described herein refers to any mode of transportation, delivery, or communication such as, for example, an automobile, a truck, a tractor, a scooter, a motorcycle, a cycle, an amphibious vehicle, a cultivator, a snowmobile, a boat, a public transit vehicle, a bus, a monorail, a train, a tram, an autonomous or automated driving vehicle, an intelligent vehicle, a self-driving vehicle, an aircraft, an unmanned aerial vehicle, a drone, or a mobile device. In an example, the position estimating apparatus is applicable to a robot requiring a positioning operation. Also, a "driving vehicle" may indicate a driver's own vehicle among vehicles traveling on a road. For example, the driving vehicle includes an autonomous driving vehicle and an intelligent vehicle including an ADAS.

FIG. 1 is a diagram illustrating an example of a method of playing music. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

In operation 110, an apparatus for playing music acquires surrounding situation information including a driving situation and a movement of an object relative to a driving vehicle. Hereinafter, the apparatus for playing music is also referred to as a playing apparatus. In an example, the object is an active object, such as, for example, vehicle(s) excluding a driving vehicle, a human including a pedestrian who suddenly appears on a road or a vehicle that approaches a driving vehicle at a high velocity, and an animal. In another example, the object is a static object, such as, buildings and objects including a traffic light, a traffic sign, a road block, a lamp pole or fire hydrant. The active object and/or the static object may directly affect a route setting of a driving vehicle. In an example, the vehicle(s) may also include a bicycle, a handcart, and various types of powered and unpowered transportations. A single object and a plurality of objects may be present.

The playing apparatus may sense the surrounding situation information using, for example, an image sensor, an ultrasonic sensor, a gyro sensor, a global positioning system (GPS) sensor, a light detection and ranging (LiDAR) sensor, a radar, and a microphone, or a combination thereof. The image sensor includes, for example, a camera, a charge coupled device (CCD) image sensor, a complementary metal oxide semiconductor (CMOS) image sensor, and a vision sensor.

In an example, the playing apparatus captures an image of an object, an environment, a lane, a road situation, and a weather around the driving vehicle using the image sensor. The playing apparatus may calculate a distance between an object and a driving vehicle using an ultrasonic sensor, a LiDAR sensor, and a radar. The playing apparatus may recognize a velocity of the driving vehicle using a gyro sensor. The playing apparatus may identify whether an object is stationary, an approaching velocity of the object, and an approaching direction of the object using a GPS sensor. The playing apparatus may collect a sound occurring around the driving vehicle using the microphone. The sound may include an ambulance siren, a police siren, a sound of vehicle collision, a sound of motorcycle, and noise of people. In an example, information on various surrounding situations to be detected by an invisible sound may be collected using a microphone.

The playing apparatus may acquire the surrounding situation information including any one or any combination of whether an object is present, a class of the object, an approaching direction of the object, an approaching distance of the object, a position of the object, a velocity of the object, whether there is a movement that is increasing or decreasing a distance between the object and the driving vehicle, a traffic situation of a road on which the driving vehicle is traveling, a type of the road, a weather, a season, and a temperature, or a combination thereof, based on various pieces of information sensed or recognized using the aforementioned various sensors and apparatuses.

The playing apparatus may recognize the surrounding situation information including whether an object is present, a class of the object, an approaching direction of the object, an approaching distance of the object, a position of the object, a velocity of the object, whether there is a movement that is increasing or decreasing a distance between the object and the driving vehicle, and a traffic situation of a road on which the driving vehicle is traveling by applying the various pieces of information sensed or recognized using the various sensors and apparatuses to a neural network In an example, the neural network learns in advance to recognize a surrounding situation based on information collected by the sensors or the apparatuses. The neural network includes, for example, a convolution neural network, a recurrent neural network, or a combination thereof.

The surrounding situation information may be understood as including information on a surrounding environment, a situation while stopping (or parking) a vehicle, and a situation while a vehicle is traveling, in addition to information sensed using various sensors.

In operation 120, the playing apparatus generates sound information for representing the surrounding situation information as a change in a sound transferred through an audio system included in the driving vehicle. In an example, "representing surrounding situation information as a change in a sound" is mapping the surrounding situation information to a moving sound corresponding to the surrounding situation information. The moving sound includes various variable elements of a sound, for example, a volume of sound, a type of sound, and a location at which the sound occurs. The type of sound may be understood as including a digital sound, for example, Dolby Surround, Dolby Surround Pro Logic, and Dolby Digital, in addition to timbres of different instruments that provide sounds.

The audio system is any apparatus that generates a three-dimensional (3D) sound to be transferred to a passenger including a driver through speakers. The audio system may be, for example, a vehicle audio including an amplifier and a plurality of speakers including a 3D sound generator, a subwoofer for supplementing and reproducing a super low-pitched range and a low-pitched sound, and a woofer for playing a low-pitched range, and a tweeter for playing a high-pitched range. Also, the audio may be understood as including an algorithm for generating a 3D sound.

The playing apparatus may generate the sound information for adjusting, based on the surrounding situation information, any one of a panning effect of the speakers, a volume of the sound transferred through the speakers, a playing speed of the sound transferred through the speakers, a position (position at which sound occurs) of a speaker that transfers the sound among the speakers, a radiating direction of the sound from the speakers, a sound attribute of the speakers, and a type of the sound transferred through the speakers, or a combination thereof. The panning effect of the speakers may be understood as an effect of allowing energies of the sound radiated from the speakers to be focused on a position, for example, a left position, a right position, a rear position, and a front position of a vehicle, and a position of a driver. The sound attribute includes, for example, a pitch, a volume, and a sound quality.

The speakers include omnidirectional speakers that radiate a sound 360 degrees, directional speakers that directly transmit a directional sound range to an ear of a user, or other various speakers. The 12, 14, or 16 speakers may be provided.

The playing apparatus may generate the sound information for the speakers based on whether the object is approaching a position of an occupant including a driver of the driving vehicle, an approaching direction of the object, and an approaching distance of the object, or a combination thereof.

The playing apparatus may generate the sound information (for example, sound information for adjusting a volume of sound transferred through speaker disposed at a position, type of sound, and sound attribute of sound) for a speaker disposed at a position among the speakers based on whether the object is approaching the position of the driving vehicle, the approaching direction of the object, and the approaching distance of the object, or a combination thereof. The playing apparatus may adjust a volume of a sound transferred through a speaker disposed in a direction of the driver in response to the object approaching the driver. The playing apparatus may increase a volume of a sound transferred through a speaker disposed in a direction of the passenger in response to the object approaching the passenger excluding the driver. The sound information may be associated with a control parameter of the audio system for 3D sound generation or a control parameter of the speakers. The playing apparatus may provide a warning message in advance for a passenger including a driver using a 3D sound generated by control parameters.

In an example, the playing apparatus generates the sound information for representing the driving situation information as the change in sound by applying the surrounding situation information to a pre-learned neural network. In an example, a neural network is learned in advance to generate the sound information for representing the surrounding situation information as the change in sound transferred through the audio included in the driving vehicle. In an example, the sound information is associated with a control parameter of the audio system or the control parameter of the speaker. Additional description of a method by which the playing apparatus generates the sound information is provided with reference to FIGS. 2 through 5.

In operation 130, the playing apparatus plays the music by adjusting the audio system based on the sound information. The playing apparatus may play the sound or the music mapped to each object by adjusting the audio system based on the sound information. The playing apparatus may play the music by adding a preset effect sound in response to the surrounding situation information. The playing apparatus may play the music as entertainment by adding an effect sound, for example, a sound of rain, a sound of snow or a sound of walking on the snow, a sound of thunder, and a sound of hail, in response to the weather, for example, a weather with rain, a weather with snow, a weather with thunder, and a weather with hail.

In addition, the playing apparatus may play the music by applying a sound effect including the sound attribute mapped to each object based on the sound information. Here, the sound effect may be understood as an effect of enriching a sound of a range in response to an equalizer adjusting a condition degree for each frequency by setting various modes, for example, a live mode, a jazz mode, a classic mode, and a concert mode.

Various surrounding situations are mapped to the music such that a passenger including a driver may comfortably realize, in real time, various events occurring when driving.

Figure 2A:
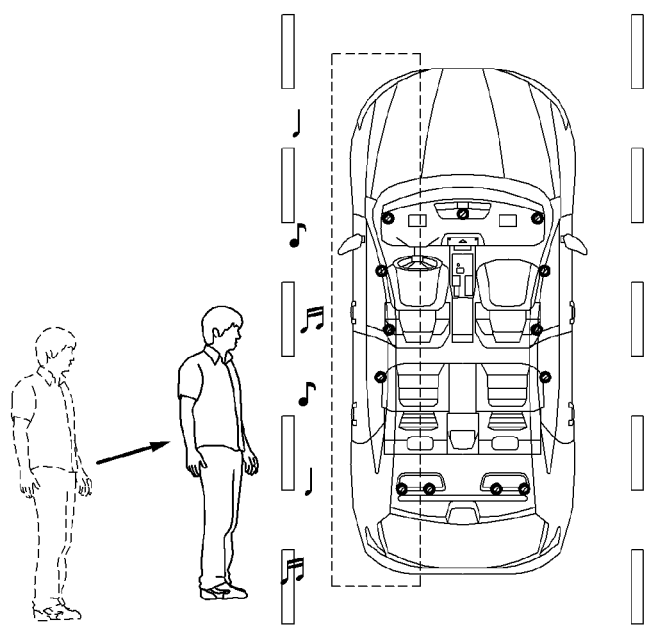
FIGS. 2A and 2B illustrate examples of a method of generating sound information based on whether an object is approaching a driving vehicle and an approaching direction of the object relative to the driving vehicle.
Figure 2B:
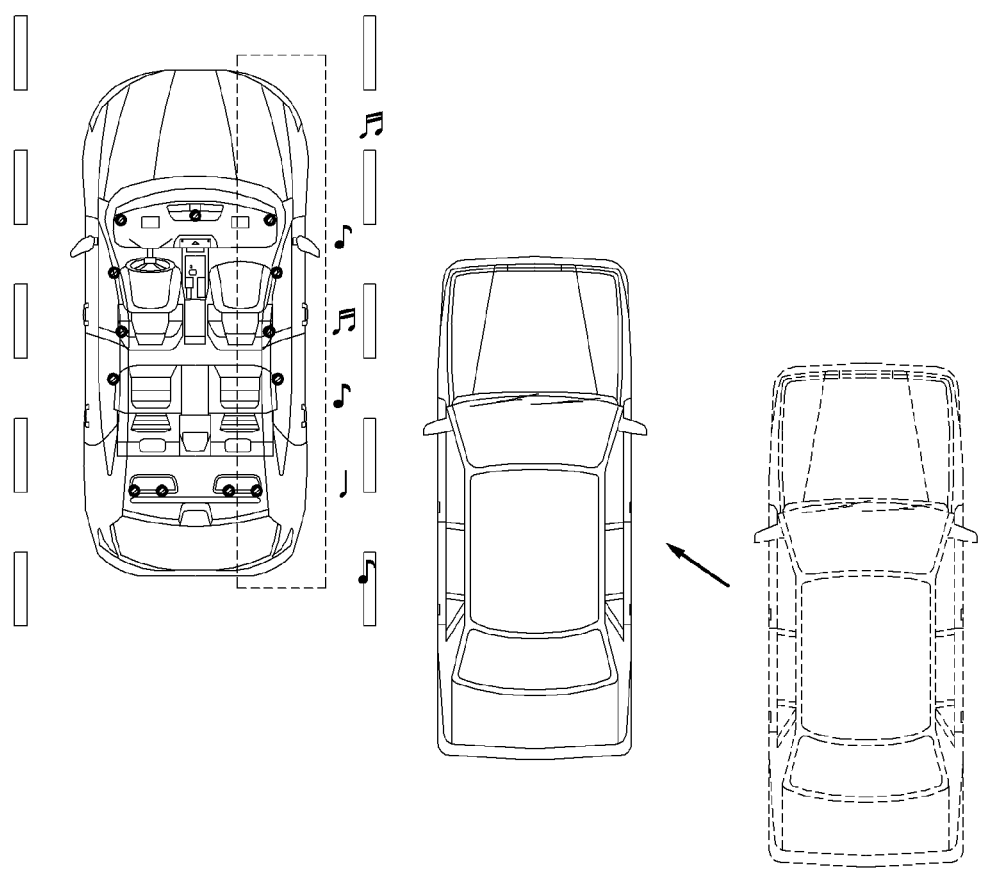

FIGS. 2A and 2B illustrate examples of a method of generating sound information based on whether an object is approaching a driving vehicle and an approaching direction of the object relative to the driving vehicle. FIG. 2A illustrates a situation in which a pedestrian approaches a driving vehicle from a left side of the driving vehicle.

In an example, a playing apparatus generates sound information including a position of a speaker that transfers a sound among speakers, a radiating direction of the sound from the speakers, and a sound attribute of the speakers based on whether the object, for example, a pedestrian, is approaching the driving vehicle, an approaching direction of the object relative to the driving vehicle, an approaching distance of the object.

As illustrated in FIG. 2A, in an example, the playing apparatus generates the sound information for transferring the sound through a speaker disposed on the left of the driving vehicle, i.e., in an approaching direction of the pedestrian in response to the pedestrian approaching the driving vehicle from the left of the driving vehicle. The playing apparatus may generate the sound information for allowing the radiating direction of the sound to be focused on the left of the driving vehicle, i.e., in a direction of the driver. In an example, the playing apparatus generates the sound information for maintaining a volume of the sound without a change with respect to right speakers among the speakers of the driving vehicle, and generate the sound information for allowing the sound to be in silence.

The playing apparatus may generate the sound information for gradually increasing the volume of the sound through a speaker disposed on the left side of the driving vehicle as the approaching distance of the pedestrian to the driving vehicle decreases, i.e., the pedestrian moves closer to the vehicle.

FIG. 2B illustrates a situation in which a vehicle gradually approaches the driving vehicle from behind the right side of the driving vehicle. In an example, the playing apparatus generates the sound information for a speaker disposed at a particular position among the speakers based on whether the object, for example, a pedestrian, is approaching a passenger including a driver of the driving vehicle, an approaching direction of the object, and an approaching distance of the object.

As illustrated in FIG. 2B, the playing apparatus generates the sound information for speakers disposed in a right direction of the driving vehicle, i.e., on the right side of the driver, in response to the vehicle gradually approaching the driving vehicle from behind the right side of the driving vehicle.

In an example, the playing apparatus generates the sound information for speakers disposed behind the right speakers in response to the vehicle being positioned behind the right side of the driving vehicle. As the vehicle gradually approaches the driving vehicle from behind the right side to the front side of the driving vehicle, the playing apparatus may gradually generate the sound information for the right front speakers. For example, the playing apparatus generates speaker-based sound information.

In an example, the playing apparatus generates different pieces of sound information for each object. The playing apparatus generates, based on the movement of the object relative to the driving vehicle, the sound information by performing a source separation on the music to map a sound of an instrument or a sound of a range to each object such that the sound of the instrument on which the source separation is performed or the sound of the range on which the source separation is performed is transferred through the speakers. In an example, the playing apparatus performs the source separation on the music such that the music is separated into single tracks for different instruments or distinct ranges, and maps the single tracks for the respective instruments or the respective ranges to respective objects. In an example, the playing apparatus generates the sound information for transferring the sound mapped to each object through the speakers.

In an example, when an object recognized based on the surrounding situation information is a pedestrian as illustrated in FIG. 2A, the playing apparatus may generate the sound information for transferring a sound of a high range of a currently playing music or a sound of a violin through speakers in a direction of the approaching pedestrian. In another example, when an object recognized based on the surrounding situation information is a vehicle as illustrated in FIG. 2B, the playing apparatus may generate the sound information for transferring a sound of a low range of a currently playing music or a sound of a cello through speakers in a direction of the approaching vehicle.

The playing apparatus may generate the sound information for playing sounds of different tracks, sounds of different instruments, and sounds of different ranges for different objects such that a passenger may easily identify a class of an object and pay attention to the object based on the class of the object.

Figure 3:
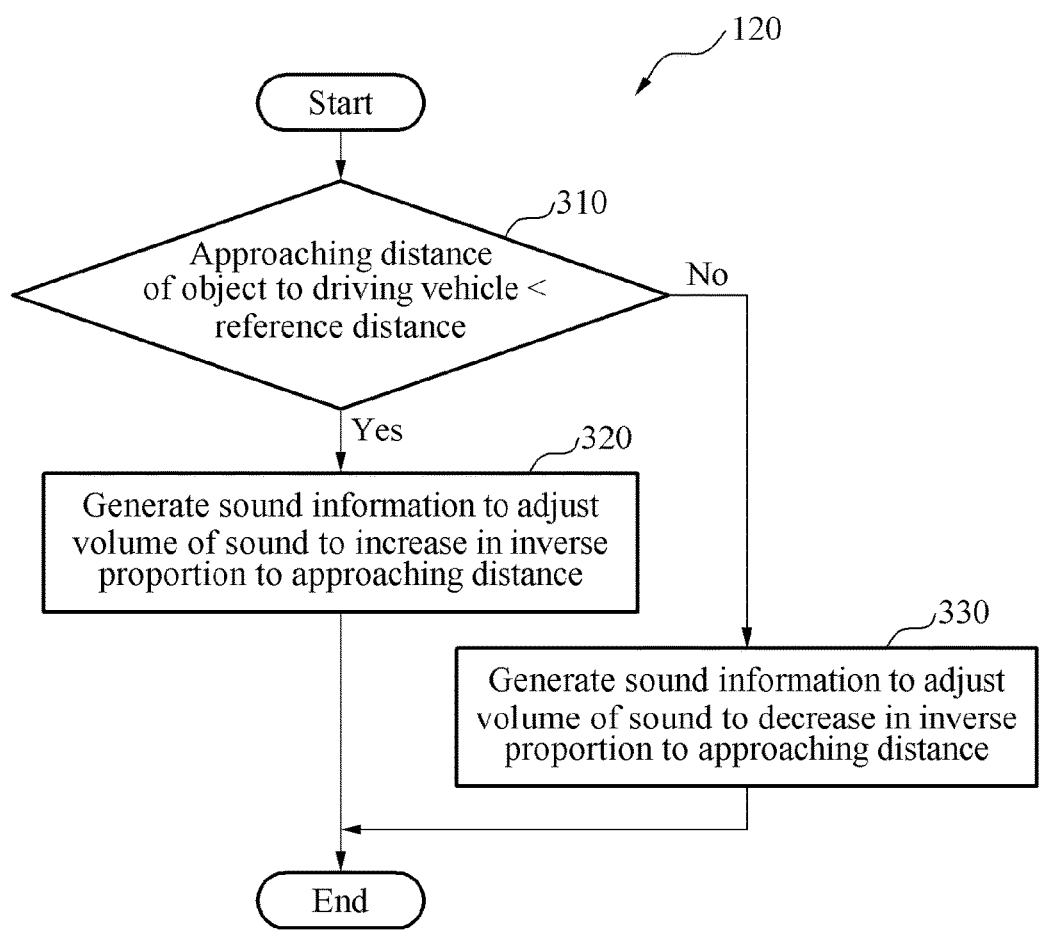
FIGS. 3 and 4 are diagram illustrating examples of a method of generating sound information.

FIG. 3 is a diagram illustrating an example of a method of generating sound information. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2B are also applicable to FIG. 3, and are incorporated herein by reference. Thus, the above description may not be repeated here.

In operation 310, a playing apparatus compares an approaching distance of an object relative to a driving vehicle to a reference distance. When the approaching distance of the object is less than (closer) the reference distance, in operation 320, the playing apparatus generates sound information for adjusting a volume of a sound transferred through speakers to increase in inverse proportion to the approaching distance.

When the approaching distance of the object is greater than or equal to (farther) the reference distance, in operation 330, the playing apparatus generates sound information for adjusting the volume of the sound transferred through the speakers to decrease in inverse proportion to the approaching distance.

The playing apparatus generates the sound information to adjust the volume of the sound to increase when the object is close to the driving vehicle, and generate the sound information to adjust the volume of the sound to decrease when the object is far from the driving vehicle.

In an example, the playing apparatus generates sound information to maintain the volume of the sound transferred through the speakers without a change in response to the approaching distance of the object relative to the driving vehicle being greater than or equal to the reference distance.

A reference distance may be variously set based on, for example, a class of an object, a velocity of the object, and a velocity of the driving vehicle. The reference distance may be pre-stored in a memory of the playing apparatus in a form of, for example, a lookup table.

The playing apparatus may generate the sound information for adjusting a volume and a type of a sound transferred through a speaker disposed at a particular position among the speakers based on whether the object is approaching, the approaching direction, and the approaching distance. Thus, a risk of traffic accident is reduced because a driver easily knows whether an object is present or is approaching even in a situation when visual identification is difficult such as when it rains or at late night.

Figure 4:
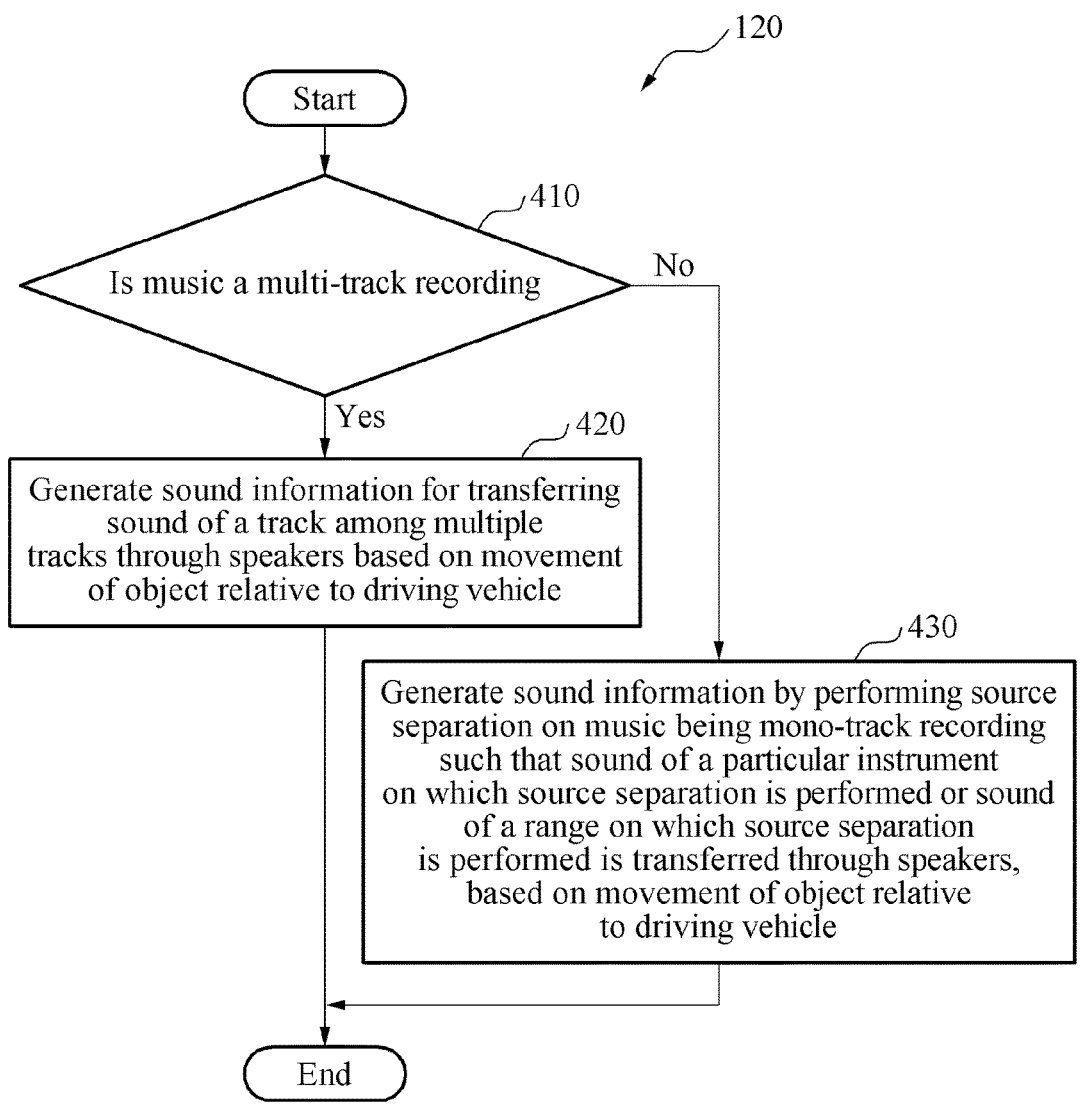

FIG. 4 is a diagram illustrating an example of a method of generating sound information. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In operation 410, a playing apparatus verifies whether the music is a multi-track recording.

When the music is the multi-track recording, in operation 420, the playing apparatus generates sound information for transferring a sound of a track among multiple tracks through speakers based on a movement of an object relative to a driving vehicle. For example, when the music (orchestral music) is a multi-track recording, the music has different tracks for respective instruments, for example, a first track recorded using a first violin, a second track recorded using a cello, a third track recorded using a viola, and a fourth track recorded using a contrabass, and an orchestral music may be heard by combining the multiple tracks. The playing apparatus may transfer the sound of a particular track among the multiple tracks through the speakers based on surrounding situation information, for example, a class of an object, a type of a road, and a traffic situation of the road, when the music is the multi-track recording.

When the music is not the multi-track recording, i.e., the music is a mono-track recording, in operation 430, the playing apparatus generates sound information by performing source separation on the mono-track recording such that a sound of a instrument on which the source separation is performed or a sound of a range on which the source separation is performed is transferred through the speakers, based on the movement of the object relative to the driving vehicle.

The source separation is a technology for separating a sound of a particular frequency band included in the music. For example, the technology may separate a sound of a frequency band based on a result of analyzing a frequency of each sound source element and a mixed sound, or separate the sound by specifying a spatial position of a sound source using a directional microphone. In an example, the playing apparatus separates the sound of an instrument or the sound of a range from the mono-track recording using various source separation algorithms. In an example, the playing apparatus generates the sound information for transferring the separated sound of the instrument or the separated sound of the range through the speakers.

In an example, based on a driving situation of the driving vehicle, the playing apparatus may generate sound information for playing any one of the sound of the particular track (sound of the instrument) and the sound of the range of the music based on the type of the road on which the driving vehicle is travelling. In an example, the type of the road includes a road type, such as, for example, a local road, an expressway, a highway, and a national highway, in addition to a lane type, such as, for example, a right-turn lane, a left-turn lane, a straight lane, and an intersection.

For example, the sound of the particular track (sound of particular instrument) or the sound of the range of the music being played based on the type of the lane is determined in advance or is a randomly mapped sound. The playing apparatus may preset the sound of the track of the music being played based on the type of the lane using a table or a list on which the sound of the track (or instrument) separated through a sound source separation program is stored in advance.

For example, the playing apparatus may generate sound information for playing a sound of a range A when the type of lane corresponds to a right-turn lane, and generate sound information for playing a sound of a range B when the type of lane corresponds to an expressway. In an example, when the type of lane corresponds to the expressway and the driving vehicle is travelling at a high velocity, the playing apparatus may generate sound information for boosting a bass portion of the music being played.

In an example, sound information that reflects a type of lane is generated and the sound information is applied to the music, such that a driver may naturally recognize a driving situation including the type of lane.

Figure 5A:
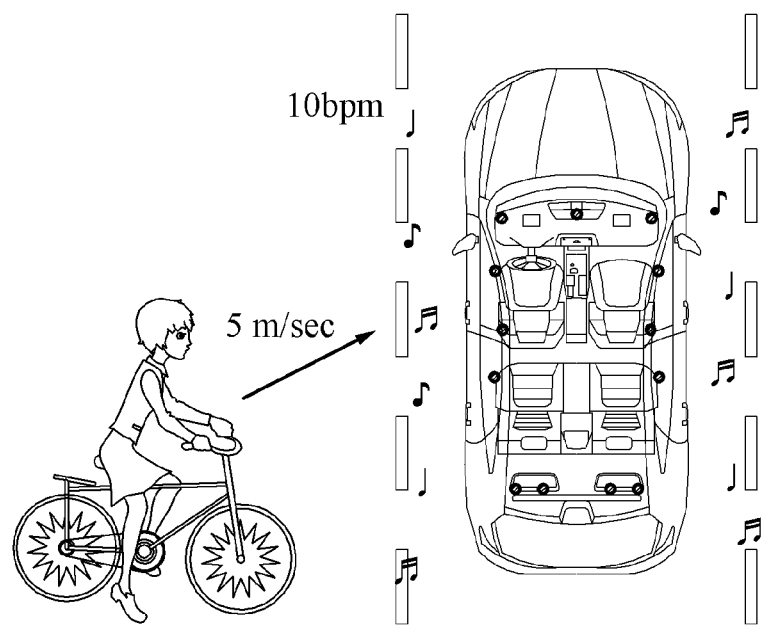
FIGS. 5A and 5B illustrate examples of a method of generating sound information based on an approaching velocity at which an object is approaching a driving vehicle.
Figure 5B:
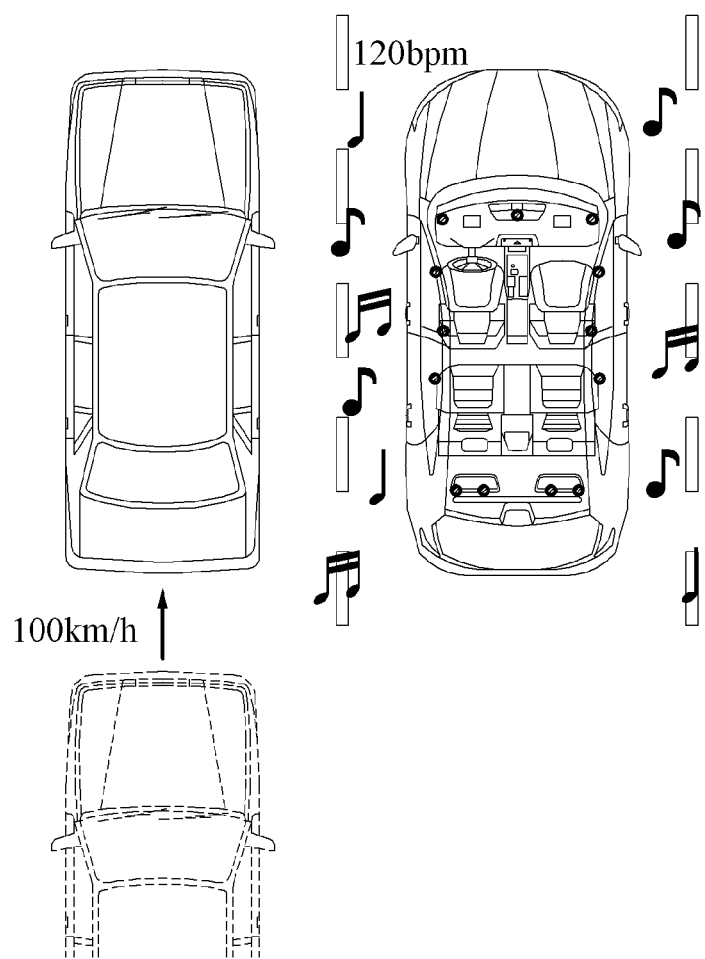

FIGS. 5A and 5B illustrate examples of a method of generating sound information based on an approaching velocity at which an object is approaching a driving vehicle. FIG. 5A illustrates a situation in which a bicycle rider approaches a left side of a driving vehicle at a speed of 5 meter per second (m/sec). A playing apparatus may recognize that the bicycle rider approaches the left side of the driving vehicle at the speed of 5 m/sec based on surrounding situation information acquired using various measuring devices, such as, for example, an image sensor, an ultrasonic sensor, a light detection and ranging (LiDAR) sensor, and a radar. The playing apparatus may generate sound information for representing a surrounding situation in which the bicycle rider approaches the left side of the driving vehicle at the speed of 5 m/sec as a change in a sound transferred through an audio. The playing apparatus may generate sound information for adjusting a playing speed of a sound transferred through speakers of the driving vehicle based on an approaching speed (5 m/sec) of an object (bicycle rider or bicycle) to the driving vehicle.

For example, it is assumed that music is being played in 5 beats per minute (BPM) before a bicycle rider or a bicycle approaches. The playing apparatus may generate sound information for increasing a playing speed of the music being played from 5 BPM to 10 BPM as the bicycle approaches at a speed of 5 m/sec.

FIG. 5B illustrates a situation in which a vehicle rapidly approaches a driving vehicle at a speed of 100 kilometer per hour (km/hour). The playing apparatus may recognize that the vehicle approaches the left side of the driving vehicle at the speed of 100 km/hour based on surrounding situation information acquired by an image sensor, such as, for example, an ultrasonic sensor, a LiDAR sensor, and a radar. The playing apparatus may generate sound information for representing a surrounding situation in which the vehicle approaches the driving vehicle at the speed of 100 km/sec as a change in sound. The playing apparatus may generate sound information for gradually increasing a playing speed of the music being played from 5 BPM to 120 BPM as the vehicle approaches the driving vehicle at the speed of 100 km/hour. The playing apparatus may generate the sound information to immediately increase the playing speed of the music from 5 BPM to 120 BPM, and generate the sound information for gradually increasing the playing speed of the music from 5 BPM to 120 BPM based on an approaching distance and/or an approaching speed of the vehicle.

In an example, the playing apparatus generates sound information for adjusting the playing speed of the sound based on various pieces of surrounding situation information, such as, for example, a type (class) of an object, a traffic situation of a road on which the driving vehicle is travelling, a type of the road, a driving situation, and the approaching speed of the object. In this example, the playing apparatus generates sound information for providing sound only from speakers disposed in the approaching direction of the object as described above.

Various situations occurring around the driving vehicle may be provided for a passenger including a driver and a fellow passenger by adjusting a volume of a sound transferred through speakers, a position at which the sound occurs, and an attribute of the sound. Thus, the passenger may intuitively understand a surrounding situation and the driver may have enough time to select a driving path.

Figure 6:
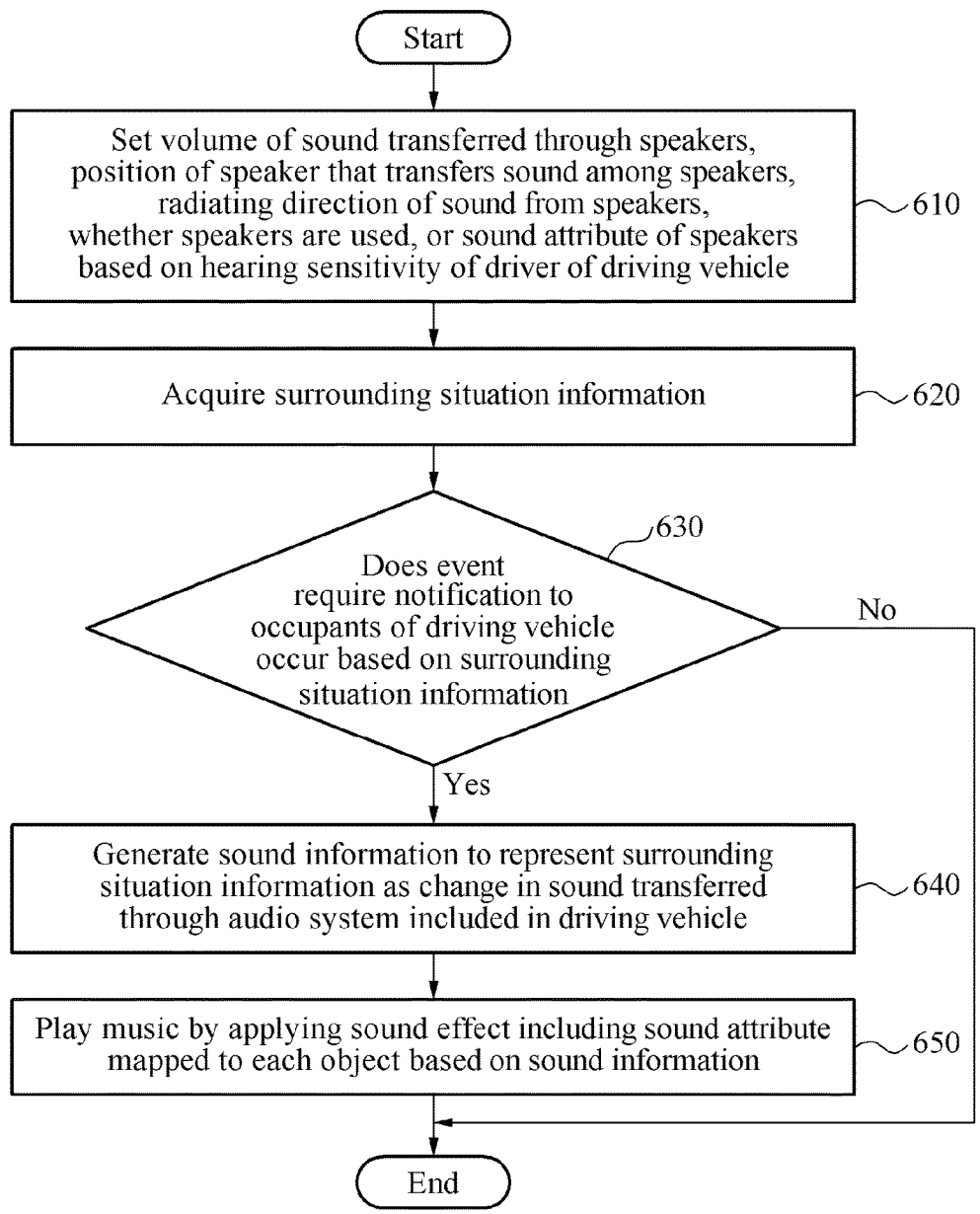
FIG. 6 is a diagram illustrating another example of a method of playing music.

FIG. 6 is a diagram illustrating another example of a method of playing music. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5B are also applicable to FIG. 6, and are incorporated herein by reference. Thus, the above description may not be repeated here.

In operation 610, a playing apparatus sets at least one of a volume of a sound transferred through speakers, a position of a speaker that transfers the sound among the speakers, a radiating direction of the sound from the speakers, whether the speakers are used, or a sound attribute of the speakers, based on a hearing sensitivity of a driver of a driving vehicle. In an example, operation 610 corresponds to a preprocessing process for driver customizing or a preset process for setting the position of speaker, the radiating direction of the speakers, and the sound attribute of the speakers based on a hearing sensitivity of a driver or a passenger of the driving vehicle. A shape and a position of an ear, and a hearing nerve may vary depending on each person. In an example, a minute difference is adjusted or set in advance to provide an optimal three-dimensional (3D) sound for a driver. In an example, the playing apparatus sets the volume of the sound, the position of the speaker that transfers the sound among the speakers, the radiating direction of the sound from the speakers, whether the speakers are used, and the sound attribute of the speakers to correspond to a listening direction that the driver actually feels, by performing a sound calibration on a plurality of speakers from a rear side to a front side, from a front side to a rear side, from a left side to a right side, and from a right side to a left side.

In addition, the driver may have difficulty in hearing with a left ear compared to a right ear, or have difficulty in hearing with a right ear, or have other hearing difficulties. In an example, in operation 610, when the driver has difficulty in hearing with a left ear compared to a right ear based on a driver's situation, the playing apparatus increases a volume of a sound transferred through speakers on a left side of the driver or sets a radiating direction of the speaker to allow the driver to hear the sound well with the right ear compared to the left ear. In another example, the playing apparatus sets a sound in advance to exclude the sound of a range that makes the driver feels tired.

In operation 620, the playing apparatus acquires surrounding situation information including a movement of an object relative to the driving vehicle.

In operation 630, the playing apparatus verifies an occurrence of an event that requires a notification directed to the occupants, including the driver of the driving vehicle, based on the surrounding situation information. In an example, events that require the notification directed to the occupants includes a siren of a special-purpose vehicle, for example, a fire truck and a police car, an environmental noise, for example, a sound of vehicle collision, of a particular situation, an image of accident between front vehicles or neighboring vehicles, and a movement of approaching vehicle at a high velocity. Based on a verification that the event that requires the notification directed to the occupants does not occur, the playing apparatus may terminate an operation.

Based on a verification that the event that requires the notification directed to the passenger occurs, in operation 640, the playing apparatus generates sound information for representing the surrounding situation information as a change in the sound transferred through an audio device included in the driving vehicle.

In operation 650, the playing apparatus plays music by applying a sound effect including a sound attribute mapped to each object based on the sound information generated in operation 640.

Figure 7:
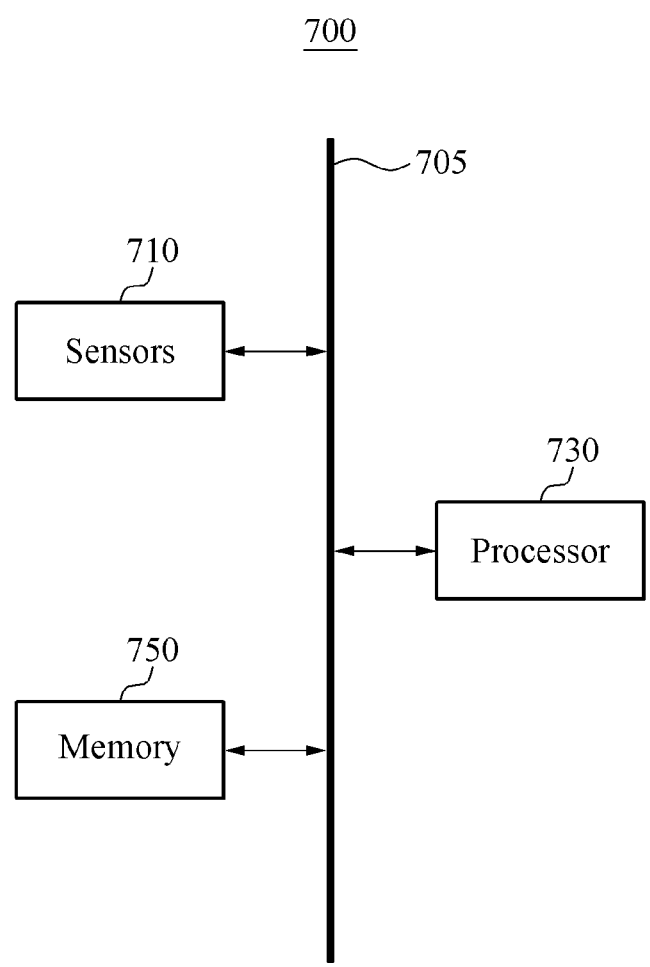
FIG. 7 is a diagram illustrating an example of a music playing apparatus.

FIG. 7 is a diagram illustrating an example of a music playing apparatus. Referring to FIG. 7, a playing apparatus 700 includes sensors 710, a processor 730, and a memory 750. The sensors 710, the processor 730, and the memory 750 communicate with each other via a communication bus 705.

The sensors 710 acquire surrounding situation information including a movement of an object relative to a driving vehicle. The sensors 710 includes, for example, an image sensor, an ultrasonic sensor, a gyro sensor, a global positioning system (GPS) sensor, a light detection and ranging (LiDAR) sensor, a radar, and a microphone.

The processor 730 generates sound information representing the surrounding situation information as a change in a sound transferred through an audio device included in the driving vehicle. The processor 730 plays music by controlling the audio device based on the sound information. In an example, the audio device includes speakers.

The processor 730 performs at least one of methods to be described with reference to FIGS. 8 and 9, in addition to at least one of the methods described above with reference to FIGS. 1 through 6. The processor 730 executes a program and controls the playing apparatus 700. A program code executed by the processor 730 may be stored in the memory 750. Further details regarding the processor 730 is provided below.

The memory 750 stores driving situation information including information sensed by the sensors 710. The information stored in the memory 750 may be used to recognize a surrounding situation in a neural network.

In addition, the memory 750 may store various pieces of information generated by the processor 730 and various pieces of information sensed by the sensors 710. The memory 750 may store various pieces of data and various programs. The memory 750 may be a volatile memory or a non-volatile memory. The memory 750 may include a large volume of storage, for example, a hard disk, to store various pieces of data. Further details regarding the memory 750 0 is provided below.

Figure 8:
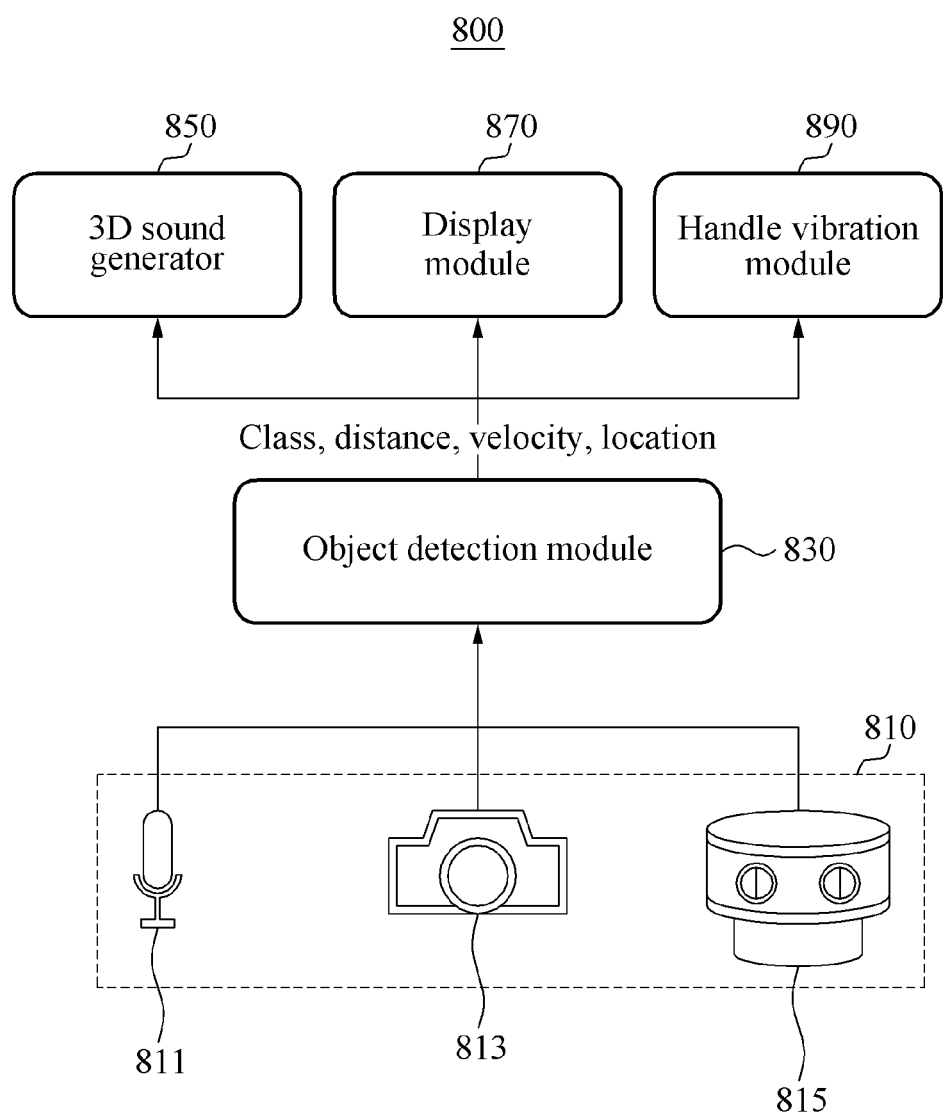
FIG. 8 illustrates an example of a music playing apparatus.

FIG. 8 illustrates an example of a music playing apparatus. Referring to FIG. 8, a playing apparatus 800 includes sensors 810, an object detection module 830, a three-dimensional (3D) sound generator 850, a display module 870, and a handle vibration module 890.

The sensors 810 acquire surrounding situation information including a movement of an object relative to a driving vehicle. In an example, the sensors 810 include sensors, such as, for example, a microphone 811, an image sensor 813, and a radar 815. The playing apparatus 800 may recognize an occluded object or a distant object invisible at night using the microphone 811 and various sensors for general recognition.

The object detection module 830 detects the object based on the surrounding situation information acquired by the sensors 810. The object detection module 830 includes a neural network learned in advance to recognize a surrounding situation based on the surrounding situation information acquired by the sensors 810. The object detection module 830 may recognize the surrounding situation information, for example, whether an object is present, a class of the object, a distance with the object, a location of the object, and a velocity of the object, by applying the surrounding situation information acquired by the sensors 810 to the neural network. The neural network may be, for example, a convolutional neural network, a recurrent neural network, or a combination thereof.

The object detection module 830 includes a processor (not shown). The object detection module 830 may generate sound information for representing the surrounding situation information as a change in a sound transferred through an audio device included in the driving vehicle using a processor.

The 3D sound generator 850 plays a 3D sound based on the sound information generated by the object detection module 830. In an example, the 3D sound generator 850 includes a source separation algorithm.

The display module 870 generates image information for representing the surrounding situation information acquired through the object detection module 830 by an image transferred through a display (not shown). The display module 870 includes the display. In an example, the playing apparatus 800 displays the image information for representing the surrounding situation information on a windshield glass of the vehicle through a head-up display (HUD). However, the displaying of the position is not limited to the example described in the forgoing, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the playing apparatus 800 may be used without departing from the spirit and scope of the illustrative examples described. In an example, the image information for representing the surrounding situation information by the image may represent content corresponding to the sound information by text, a word, a sign, and an image. An example of the image information played through the display is described with reference to FIG. 9.

The handle vibration module 890 generates vibration information for representing the surrounding situation information by a handle vibration of the driving vehicle. The vibration information may be transferred to a driver through the steering wheel or handle of the vehicle.

The playing apparatus 800 provides a hearing-impaired person with information identical to the sound information through the display module 870 and/or the handle vibration module 890.

Figure 9:
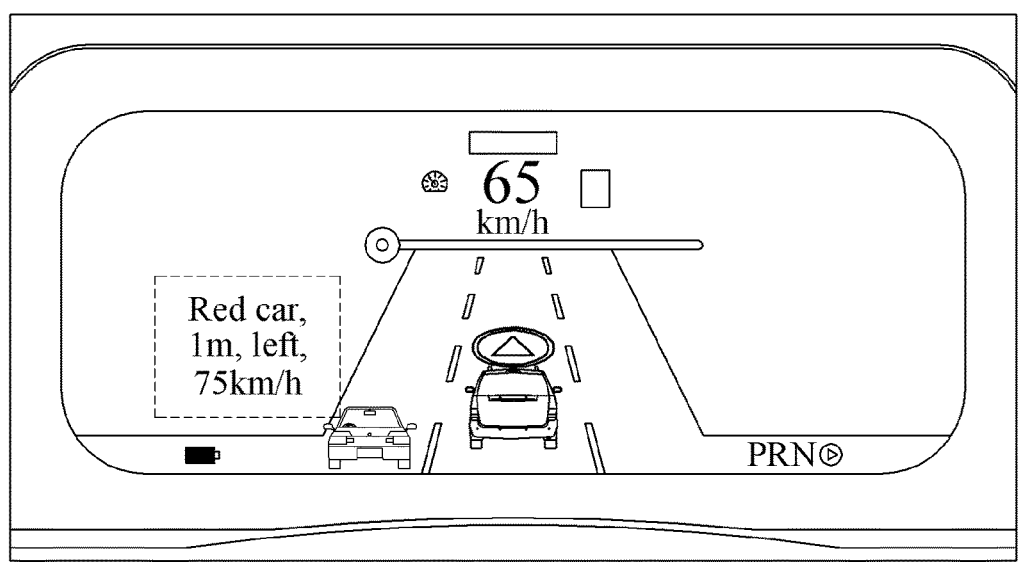
FIG. 9 illustrates an example of a screen provided for a driver through a display of FIG. 8.

FIG. 9 illustrates an example of a screen provided for a driver through a display of FIG. 8. FIG. 9 illustrates a screen on which image information for representing surrounding situation information by an image is played through a display.

For example, it is assumed that a red vehicle approaches 1 meter behind a left side of a driving vehicle at a velocity of 75 km/h. A playing apparatus may generate image information to represent, by text, a sign, or an image, surrounding situation information, for example, whether an object is present: present, a class of object: red vehicle, a location of object: 1 meter behind the left side of driving vehicle, a velocity of object: 75 km/h, and a distance between object and driving vehicle: decrease.

The playing apparatus may play, through a display, the driving situation information, for example, image information represented by a combination of an image indicating a driving situation, a number indicating a velocity of the driving vehicle, and "Red car, 1 m, left, 75 km/h" indicated in a dotted line box. Thus, the playing apparatus may provide information represented like sound information when it is difficult to provide the sound information due to hearing impairment or it is difficult to hear a sound due to surrounding noise.

The playing apparatus 700, playing apparatus 800, an object detection module 830, a three-dimensional (3D) sound generator 850, and other apparatuses, units, modules, devices, and components illustrated in FIGS. 7-8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIGS. 1, 3-4, and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes at least one of an applet, a dynamic link library (DLL), middleware, firmware, a device driver, an application program storing the method of preventing the collision. In one another example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of playing music, the method comprising:
    acquiring surrounding situation information comprising a movement of an object relative to a vehicle;
    generating sound information to represent the surrounding situation information as a change in an audible characteristic of the music transferred through an audio device of the vehicle, the audio device comprising speakers; and controlling the audio device to play the music having the change in the audible characteristic based on the sound information, wherein the generating of the sound information comprises:

generating the sound information for transferring a sound of a track of the music among multiple tracks of the music through the speakers based on the movement of the object relative to the vehicle, in response to the music being a multi-track recording; and generating the sound information by performing a source separation on the music such that a sound of an instrument on which the source separation is performed or a sound of a range on which the source separation is performed is transferred through the speakers, based on the movement of the object relative to the vehicle, in response to the music being a mono-track recording.

2. The method of claim 1, wherein the movement of the object relative to the vehicle comprises any one or any combination of whether the object is present, whether the object is stationary, a class of the object, an approaching direction of the object, an approaching distance of the object, a position of the object, a velocity of the object, whether a distance between the object and the vehicle is increasing or decreasing, and wherein the surrounding situation information further comprises a driving situation, the driving situation comprising any one or any combination of a traffic situation of a lane on which the vehicle is traveling, a type of the lane, a weather, a season, a light condition, and a temperature.

3. The method of claim 1, wherein the change in the audible characteristic of the music comprises:

any one or any combination of a panning effect of the speakers outputting the music, a volume of the music transferred through the speakers, a playing speed of the music transferred through the speakers, a position of a speaker that transfers the music among the speakers, a radiating direction of the music from the speakers, a sound attribute of the speakers outputting the music, and a type of the music transferred through the speakers.

4. The method of claim 1, wherein the change in the audible characteristic of the music comprises:

based on a hearing sensitivity of a driver of the vehicle, at least one of a volume of the music transferred through the speakers, a position of a speaker that transfers the music among the speakers, a radiating direction of the music from the speakers, whether the speakers are used for outputting the music, or a sound attribute of the speakers outputting the music.

5. The method of claim 1, wherein the surrounding situation information further comprises any one or any combination of whether the object is approaching a position of a passenger including a driver of the vehicle, an approaching direction of the object, and an approaching distance of the object, and wherein the generating of the sound information comprises:

generating the sound information for a speaker disposed at a position among the speakers based on any one or any combination of whether the object is approaching the position of the passenger including the driver of the vehicle, the approaching direction of the object, and the approaching distance of the object.

6. The method of claim 1, wherein the surrounding situation information further comprises any one or any combination of whether the object is approaching the vehicle, an approaching direction of the object, and an approaching distance of the object, and wherein the generating of the sound information comprises:

generating the sound information for adjusting a volume of the music transferred through a speaker disposed at a position among the speakers based on any one or any combination of whether the object is approaching the vehicle, the approaching direction of the object, and the approaching distance of the object.

7. The method of claim 6, wherein the generating of the sound information for adjusting the volume of the music comprises:

increasing the sound information for adjusting the volume of the music transferred through the speakers in inverse proportion to the approaching distance of the object, in response to the approaching distance of the object relative to the vehicle being less than a reference distance.

8. The method of claim 7, wherein the reference distance is stored in a lookup table in a non-transitory computer-readable storage medium, and is based on any one or any combination of a class of the object, a velocity of the object, and a velocity of the vehicle.

9. The method of claim 6, wherein the generating of the sound information for adjusting the volume of the music comprises:

decreasing the sound information for adjusting the music transferred through the speakers in inverse proportion to the approaching distance, in response to the approaching distance of the object relative to the vehicle being greater than or equal to a reference distance; or maintaining the volume of the music transferred through the speakers without a change, in response to the approaching distance of the object relative to the vehicle being greater than or equal to the reference distance.

10. The method of claim 1, wherein the surrounding situation information further comprises an approaching direction of the object relative to the vehicle, and wherein the generating of the sound information comprises:

generating the sound information for determining any one or any combination of a position of a speaker that transfers the music among the speakers and a radiating direction of the music, based on the approaching direction of the object relative to the vehicle.

11. The method of claim 1, wherein the generating of the sound information comprises:

generating, based on the movement of the object relative to the vehicle, the sound information by performing the source separation on the music to map a sound of the instrument or a sound of a range to the object such that the sound of the instrument on which the source separation is performed or the sound of the range on which the source separation is performed is transferred through the speakers.

12. The method of claim 11, wherein the generating of the sound information comprises:

separating the music into single tracks for respective instruments or respective ranges based on performing the source separation on the music;

mapping the single tracks for the respective instruments or the respective ranges to the object; and generating the sound information for transferring the music mapped to the object through the speakers.

13. The method of claim 1, wherein the generating of the sound information comprises:

generating the sound information for adjusting a playing speed of the music transferred through the speakers based on an approaching velocity at which the object is approaching the vehicle.

14. The method of claim 1, wherein the generating of the sound information comprises:

generating the sound information for playing any one of a sound of the track of the music, a sound of the instrument included in the music, and a sound of a range of the music, in response to a type of a lane on which the vehicle is traveling.

15. The method of claim 1, wherein the controlling comprises:

playing the music by applying a sound effect including a sound attribute mapped to the object based on the sound information.

16. The method of claim 1, wherein the controlling comprises:

playing the music by adding a preset effect sound, in response to the surrounding situation information.

17. The method of claim 1, wherein the acquiring of the surrounding situation information comprises:

sensing the surrounding situation information using any one or any combination of an image sensor, an ultrasonic sensor, a global positioning system (GPS) sensor, a light detection and ranging (LiDAR) sensor, a radar, and a microphone.

18. The method of claim 1, further comprising:

verifying occurrence of an event that requires a notification directed to an occupant of the vehicle based on the surrounding situation information, wherein the generating of the sound information comprises generating the sound information, in response to the occurrence of the event.

19. The method of claim 1, wherein the acquiring of the surrounding situation information comprises recognizing the surrounding situation information based on applying data collected from sensors to a trained neural network.

20. A non-transitory computer-readable storage medium storing instructions that, when executed by a processor, cause the processor to perform the method of claim 1.

21. An apparatus for playing music, comprising:

sensors configured to acquire surrounding situation information comprising a movement of an object relative to a vehicle; and a processor configured to generate sound information to represent the surrounding situation information as a change in an audible characteristic of the music transferred through an audio device of the vehicle, the audio device including speakers, and to control the audio device to play the music having the change in the audible characteristic based on the sound information, wherein the processor is configured to generate the sound information by:

generating the sound information for transferring a sound of a track of the music among multiple tracks of the music through the speakers based on the movement of the object relative to the vehicle, in response to the music being a multi-track recording; and generating the sound information by performing a source separation on the music such that a sound of an instrument on which the source separation is performed or a sound of a range on which the source separation is performed is transferred through the speakers, based on the movement of the object relative to the vehicle, in response to the music being a mono-track recording.

* * * * *